United States Patent
Uozumi

[11] 3,938,409
[45] Feb. 17, 1976

[54] CONTROL SYSTEM FOR AUTOMATIC TRANSMISSIONS OF AUTOMOTIVE VEHICLES

[75] Inventor: Sumio Uozumi, Aichi, Japan

[73] Assignee: Toyota Jidosha Kogyo Kabushiki Kaisha, Japan

[22] Filed: Sept. 4, 1973

[21] Appl. No.: 393,881

[30] Foreign Application Priority Data
Sept. 8, 1972 Japan.............................. 47-89518

[52] U.S. Cl................. 74/866; 60/DIG. 2; 417/1 B; 417/326; 74/856; 74/869; 74/752 A
[51] Int. Cl.². B60K 41/18; F16H 3/74; F04B 49/00
[58] Field of Search ............ 74/866, 867, 868, 869, 74/752 A, 752 C, 752 D, 856, 857, 858, 859, 860, 861, 862, 863, 864, 865; 60/382, 383, DIG. 2; 417/18, 45, 326

[56] References Cited
UNITED STATES PATENTS

| | | | |
|---|---|---|---|
| 2,977,765 | 4/1961 | Fillmore............................ | 60/382 |
| 3,633,439 | 1/1972 | Annis................................ | 74/869 X |
| 3,646,835 | 3/1972 | Ito et al. .......................... | 74/866 X |
| 3,650,161 | 3/1972 | Ito et al. .......................... | 74/866 |
| 3,673,892 | 7/1972 | Kato et al. ....................... | 74/866 X |
| 3,701,294 | 10/1972 | Ito et al. .......................... | 74/866 |
| 3,750,495 | 8/1973 | Ito et al. .......................... | 74/866 |
| 3,776,048 | 12/1973 | Enomoto et al..................... | 74/866 |

Primary Examiner—Samuel Scott
Assistant Examiner—Lance W. Chandler
Attorney, Agent, or Firm—Toren, McGeady and Stanger

[57] ABSTRACT

An hydraulic control circuit for an automotive vehicle automatic transmission includes an oil pump driven by a motor and shift valves for applying hydraulic pressures to hydraulic servos for engaging or disengaging clutches and for applying or releasing brake bands causing upshift or downshift of the transmission. The oil pump motor drive control circuit is provided with a detector for detecting traveling velocity of the vehicle, a detector for detecting the load of the vehicle engine, a range signal generator for generating a signal representative of a selected range position, a shift signal generator adapted to determine, in response to a signal from the range signal generator, a shift point and for generating a shift signal, a motor drive circuit adapted to vary the rotational speed of the motor for driving the oil pump in two stages, and a motor drive control circuit adapted to control said motor drive circuit so as to cause said motor to drive at a high speed for a time interval required for completely engaging the clutches and applying the brake bands when the upshift, downshift or shift from N or P range occur.

7 Claims, 6 Drawing Figures

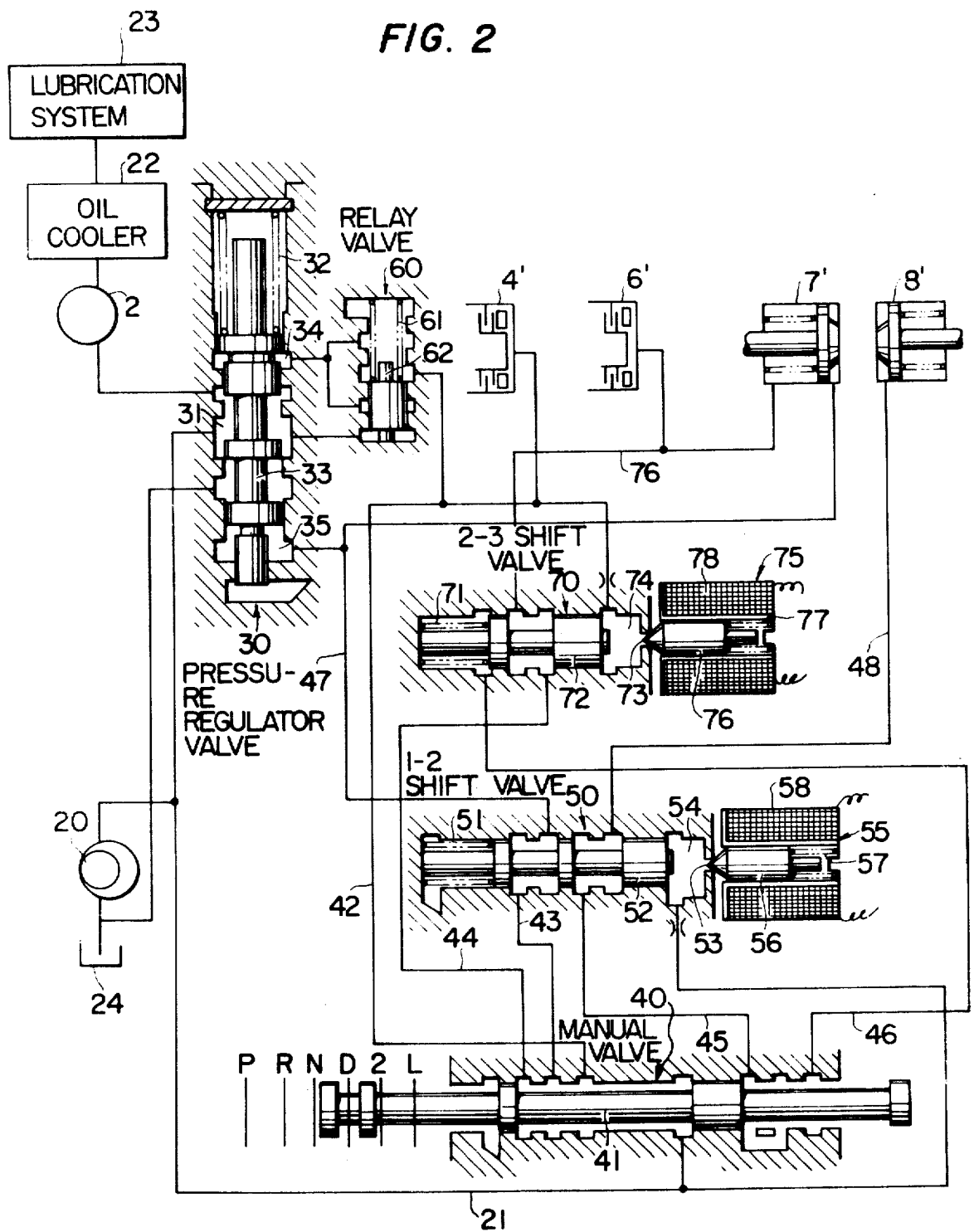

CONTROL SYSTEM FOR AUTOMATIC TRANSMISSIONS OF AUTOMOTIVE VEHICLES

BACKGROUND OF THE INVENTION

The present invention relates generally to a control system for automatic transmissions of automatic vehicles and more particularly to a control system for applying minimum hydraulic pressure to the hydraulic servos of frictional engagement means such as front and rear clutches and front and rear bands when an automotive vehicle is traveling at a constant speed and for increasing the hydraulic pressure applied to the hydraulic servos for a time interval required for engaging the clutches and/or applying the brake bands when upshift, downshift or range shift occur. An oil pump, which is a hydraulic pressure source, is controlled by a prime mover such as an electric motor or by any other driving means other than the output shaft of the automatic vehicle.

Control systems for fluid type automatic transmissions generally include an oil pump for applying hydraulic pressure to frictional engagement means, a torque converter and a lubrication system. Generally two oil pumps, i.e. a front oil pump and a rear oil pump, are provided in order to secure a desired hydraulic pressure at low speed and to minimize noise and horsepower loss at high speed. The former is driven by a prime mover whereas the latter is driven by the output shaft of the transmission. Since automatic transmissions with two oil pumps are generally large in size and complex in construction, the recent trend is toward use of only one front oil pump in such a manner that the hydraulic pressure produced by the front oil pump is increased or decreased by a valve mechanism when an automotive vehicle is traveling at a constant speed or is accelerated. Since the rotational speed of the oil pump ranges from 500 to 6,000 rpm, the discharge of the oil pump is less when the prime mover is rotating at a low speed so that the hydraulic pressure and lubrication become insufficient. When upshift, downshift or range shift occur when the hydraulic pressure is insufficient, hydraulic response delay of the hydraulic servos occurs and the hydraulic pressure tends to be applied to only one hydraulic servo so that the hydraulic pressure in other hydraulic servos tends to drop. This results in short service life of the frictional engagement means. On the other hand when the prime mover rotates at a high speed, excess hydraulic pressure is produced thereby causing unstable hydraulic control, vibrations in the valve system of the device, cavitation and similar problems resulting from flow forces. Furthermore, horsepower consumption is increased.

Accordingly, it is a primary object of the present invention to provide a control system for automatic transmissions of automotive vehicles in which a single oil pump is driven by a prime mover or other suitable driving means, except the output shaft of an automatic transmission, in such a manner that the pump discharge may be maintained minimum when the vehicle is traveling at a constant speed, thereby minimizing the horsepower consumption, with the pump discharge being increased during shifting thereby preventing hydraulic response delay and undesired decrease in hydraulic pressure.

SUMMARY OF THE INVENTION

Briefly, the present invention may be described as a control system for controlling hydraulic pressure in a hydraulic control circuit for automotive vehicle automatic transmissions. The transmission includes clutch and brake means which operate to determine the gear ratios for the transmission. Hydraulic servo means responsive to hydraulic pressure operate the clutch and the brake means to provide a desired gear ratio, with conduit means being provided for transmitting hydraulic fluid from the hydraulic control circuit to the servo means. The control system of the present invention particularly comprises an oil pump for supplying oil under pressure to the hydraulic control circuit, means for driving the oil pump and an oil pump drive control circuit which controls the oil pump drive means to vary the output of the oil pump in accordance with operation of the automatic transmission. The hydraulic control circuit includes means for automatically shifting gear ratios in said automatic transmission and means for manually selecting an operating range for the transmission. The oil pump drive control circuit maintains the oil pump output at a lower level when no gear ratio shifting and no range shifting is occurring in the transmission and increases the output of the oil pump to a higher level for a time period during operation of the servo means when gear ratio shifting or range shifting is occurring.

More particularly, the control system of the present invention includes a logic circuit which derives control signals from automatic shifting means of the hydraulic control circuit and from the manual selecting means and which derives therefrom a control signal to be applied as a control function to the oil pump drive means. Thus, the output of the oil pump may be controlled in response to operation of the automatic transmission with an increased pump output occurring when gear shifting or range shifting is taking place and with a lower pump output being provided during normal vehicle operation.

DETAILED DESCRIPTION OF THE PREFERRED EMBODIMENTS:

FIG. 2 is a schematic view of a hydraulic control circuit in accordance with the present invention;

DESCRIPTION OF THE PREFERRED EMBODIMENT

Figure 1:
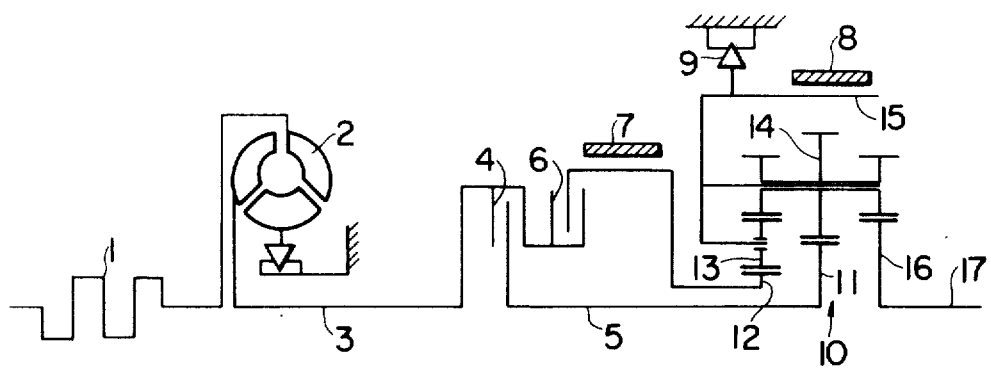
FIG. 1 is a schematic view depicting an automatic transmission to which the present invention may be applied.

FIG. 1 shows an automatic transmission or threeforward-speed one-reverse torque converter. A crank shaft 1 of an engine is coupled through a torque converter 2 to a turbine shaft 3 which in turn is coupled through a front clutch 4 and an intermediate shaft 5 to an input sun gear 11 of a planetary gear set 10 and to a reverse sun gear 12 through a rear clutch 6. In addition to the sun gears 11 and 12 the planetary gear set further includes an idler in engagement with the reverse sun gear 12, pinions 14 in engagement with the input sun gear 11, idlers 13 and a carrier 15 having the idler gears 13 and the pinion gears 14 rotatably carried thereon. The pinion gears 14 are coupled through a gear 16 to an output shaft 17, and a rear clutch drum is provided with a front brake band 7 for controlling the reverse sun gear 12. The carrier 15 is provided with a rear brake band 8 and a one-way clutch 9.

With the front clutch 4 engaged, power is transmitted from the crank shaft 1 through the torque converter 2 and the intermediate shaft 5 to the input sun gear 11 so that first gear is obtained from the output shaft 17 with the carrier 15 held stationary by the one-way clutch 9. When the one-way clutch 9 functions as a free wheel, the rear brake band 8 locks the carrier 15 so that the first gear with engine braking is obtained. When the front clutch 4 is locked and the front brake band 7 is applied to lock the reverse sun gear, second gear is obtained. When the rear clutch 6 is locked whereas the front brake band 7 is released, power is transmitted to the reverse sun gear 12 and the entire unit is locked together so that power is transmitted directly from the converter to the output shaft 17. Thus direct drive is obtained. When rear clutch 6 is locked with the front clutch 4 released and the carrier 15 is locked by the rear brake band 8, power is transmitted to the reverse sun gear 12 and the idler 13 is reversed in direction so that reverse gear is obtained.

Next referring to FIG. 2 illustrating a hydraulic control system for the three-speed converter described above, and more particularly for selectively locking the clutches 4 and 6 and selectively applying the brake bands 7 and 8, an oil pump 20, which will be described in more detail hereinafter, driven by a DC motor, to be described in more detail hereinafter, supplies oil from an oil reservoir 24 through an oil line 21 to a pressure regulator valve 30, a manual valve 40 and a 1–2 shift valve 50. The pressure regulator valve 30 is adapted to discharge oil from oil line 21 and includes an oil chamber 31—from which oil is supplied to the torque converter 2, an oil cooler 22 and a lubrication system 23—and oil chambers 34 and 35 formed on both sides of the oil chamber 31 for exerting hydraulic pressure to a spool 33 loaded with a spring 32, thereby controlling the hydraulic pressure in the oil line 21. The manual valve 40 is coupled to a shift lever (not shown) and comprises a spool 41 which may be selectively shifted to the positions P,R,N,D,2, and L, and five oil lines 42-46 to be selectively communicated with the oil line 21 as one of the five positions is selected. The oil line 42 is communicated with a relay valve 60, a servo 4' for the front clutch and a 2–3 shift valve 70. The oil lines 43 and 45 are communicated with the 1–2 shaft valve 50. The oil lines 44 and 46 are communicated with the 2–3 shift valve 70. The 1–2 shift valve 50 comprises a spool 52 loaded with a spring 51 and an actuating oil chamber 54 provided with a discharge orifice 53 and communicated with the oil line 21. A plunger 56 of a solenoid valve 55 is adapted to close the discharge orifice 53 under the force of a spring 57 and to open the discharge orifice 53 when a solenoid 58 is energized. When the discharge orifice 53 is closed as the solenoid 58 is de-energized so that the spool 52 is shifted toward the left under the hydraulic pressure accumulated in the chamber 54, the oil line 43 is communicated through the oil line 47 with the oil chamber 35 of the pressure regulator valve 30 and to the supply side of the front brake band servo 7' whereas the oil line 45 is communicated with a rear brake band servo 8' through the oil line 48. When the solenoid valve 58 is energized so that the discharge orifice 53 is opened, the spool 52 is shifted to the right position under the force of the spring 51, and the oil line 45 is communicated with the oil line 47.

The 2–3 shift valve 70 comprises a spool 72 engaged by a spring 71, and an actuating oil chamber 74 communicated with the oil line 42 and provided with a discharge orifice 73. The 2–3 shift valve 70 is coupled to a solenoid valve 75 comprising a plunger 76 engaged by a spring 77 and a solenoid 78. When the solenoid 78 is de-energized so that the spool 72 is shifted to the left position as shown in FIG. 2, the oil line 44 is communicated through the oil line 76 with a rear clutch servo 6' and the release side of the front brake band servo 7'. When the solenoid 78 is energized so that the spool 72 is shifted to the right position, the oil line 46 is communicated with the oil line 76.

The relay valve 60 comprises a spool 62 loaded with a spring 61 and is adapted to communicate the oil line 42 with the oil chamber 34 of the pressure regulator valve 30 so as to increase the line pressure.

When the plunger 41 of the manual valve 40 is shifted to the position R, the hydraulic pressure in the oil line 21 is transmitted to the hydraulic lines 45 and 46 and from the oil line 45 to the servo 8' through the oil line 48 because the solenoid 58 is not energized. The spool of the 2–3 shift valve 70 is shifted as the pressure in the oil line 42 is reduced so that the hydraulic pressure is applied from the oil line 46 through the oil line 76 to the hydraulic servo 6'.

When the position N is selected, the spool 41 of the manual valve 40 interrupts the oil line 21. When the D position is selected, the hydraulic pressure in the oil line 21 is transmitted to the oil lines 42, 43 and 44 so that the hydraulic pressure is directly transmitted to the hydraulic servo 4'. When the solenoids 58 and 78 are both energized when the first gear is selected, the hydraulic pressure in the oil line 43 is reduced through the 1–2 shift valve whereas the oil line 44 is interrupted by the 2–3 shift valve 70.

When only the solenoid 58 is de-energized when second gear is selected, the oil flows from the oil line 43 through the oil line 47 to the supply side of the hydraulic servo 7'. When the solenoid valve 75 is de-energized when the third gear or direct drive is selected, the oil flows from the oil line 44 through the oil line 76 into the hydraulic servo 6' by the 2–3 shift valve, and the oil also flows into the release side of the hydraulic servo 7' so that the front brake band 7 is released under the force of a spring. When the 3–2 shift occurs, the oil is discharged from both oil lines 44 and 46 so that no oil flows into the release sides of the hydraulic servos 6' and 7' regardless of the operation of the 2–3 shift valve 70 whereas the oil flows from the oil line 42 into the hydraulic servo 4'. When the solenoid 58 is energized, the oil in the oil line 43 is discharged so that the second gear is selected. When the L position is selected, no oil flows into the release sides of the hydraulic servos 6' and 7' as is the case in second gear whereas the oil flows into the servo 4' from the line 42 and 45. When the solenoid 58 is de-energized, the oil flows from the oil line 45 through the line 48 to the hydraulic servo 8' by the 1–2 shift valve 50 so that the first gear with engine braking is obtained.

The mode of operation of the hydraulic control system described hereinbefore may be summarized as follows:

TABLE I

| Position of Manual Valve | first | second | third | first | second |
|---|---|---|---|---|---|
| Solenoid 58 | 0 | X | X | 0 | X | X |
| Solenoid 78 | 0 | 0 | X | — | — | — | where 0 = energized, and X = de-energized.

Figure 3:
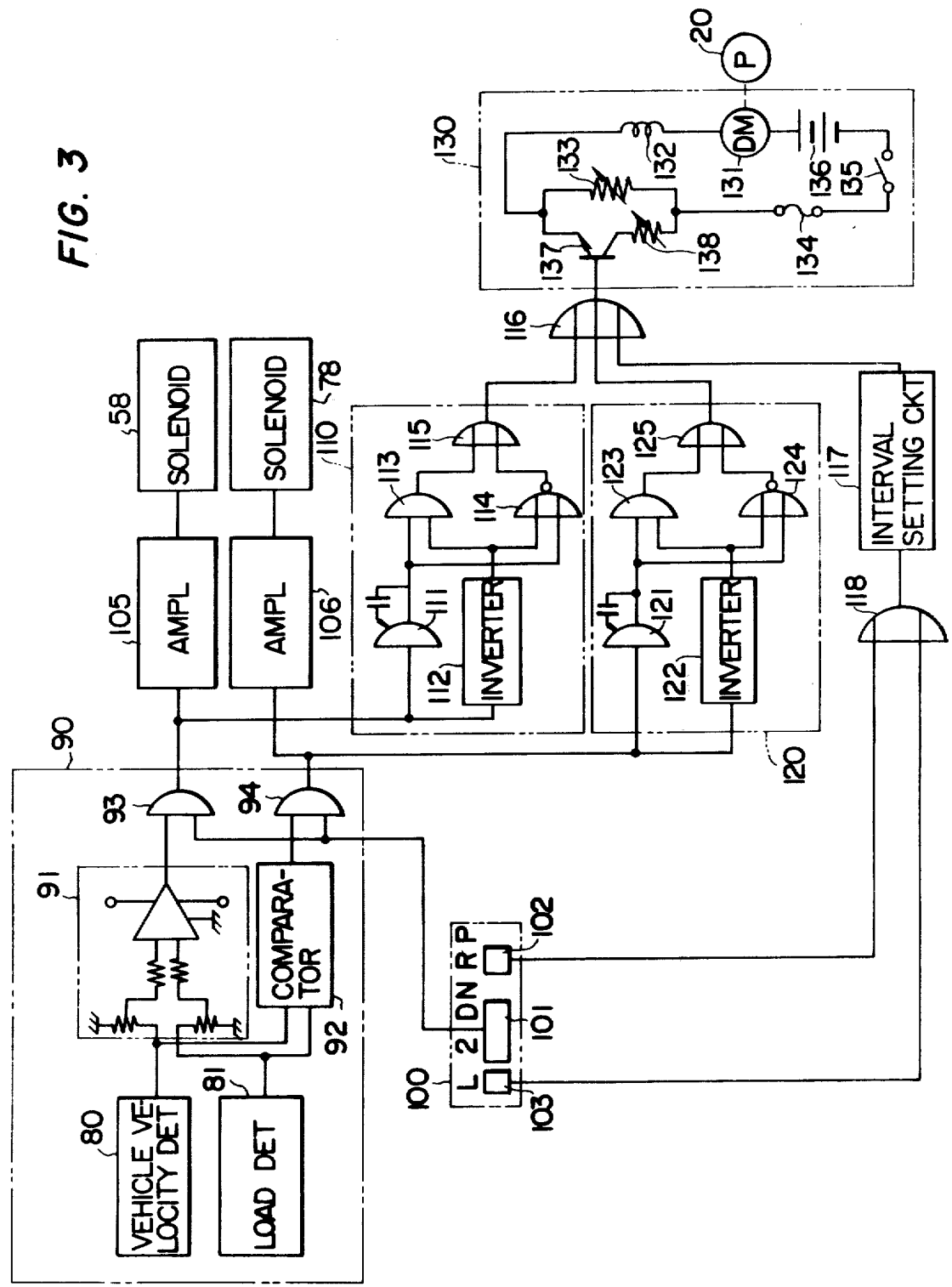
FIG. 3 is a schematic diagram of an electronic control circuit in accordance with the present invention.

Next a shift control circuit for energizing or de-energizing the solenoids 58 and 78 in the hydraulic control circuit shown in FIG. 2 will be described with reference to FIG. 3. A shift signal generator 90 generates the shift signal by automatically setting a shift point based upon a shift pattern which in turn is based upon the relationship between the speed of the automotive vehicle and the load of the engine. A range signal generator 100 generates a range signal in response to a range selected by the shift lever. Amplifiers 105 and 106 are adapted to energize the solenoids 58 and 78 in response to the shift signal.

The shift signal generator 90 comprises generally a vehicle velocity detector 80, a load detector 81 which is adapted to generate as an output, for example, analog signals in four steps depending upon an opening of the throttle, two comparators 91 and 92 substantially similar in construction and AND gates 93 and 94 which are connected to a switch 101 for D and 2 ranges in the range signal generator 100. When the D or 2 range is selected the switch 101 is closed so that the AND gates 93 and 94 are conductive. In the comparators 91 and 92 the voltages representing the vehicle velocity and the engine load are compared in such a manner that when the voltage representing the engine load is greater both comparators 91 and 92 give the output signals "1". When the voltage representing the vehicle velocity is higher, only the comparator 92 gives the output signal "1" whereas when the vehicle velocity is further increased no signal "1" is derived from the comparators 91 and 92. In response to the output signal "1" the solenoids 58 and 78 are energized as shown in Table I above.

In the shift control circuit there are inserted two motor drive control circuits for controlling the drive motor for the oil pump. A first motor drive control circuit 110 connected to the amplifier 105 comprises a delay circuit 111, an inverter circuit 112, an AND gate 113, a NOR gate 114 and an OR gate 115. The delay circuit 111 is adapted to delay the signal a time interval $t$ (of the order of about 0.5 sec.) required for completely locking the clutch or applying the brake band. A second motor drive control circuit 120 connected to the second amplifier 106 comprises a delay circuit 121, an inverter circuit 122, an AND circuit 123, a NOR circuit 124 and an OR circuit 125. The outputs of the OR circuits 115 and 125 are connected to the input of a third OR circuit 116, to which are also connected switches 102, and 103 for R and L ranges in the range signal generator 100 through an OR gate 118 and a signal time interval setting circuit 117 comprising for example a monostable multivibrator having a transistion time $t$. Therefore the signal having a time width $t$ is applied to the OR gate 116 when one of the switches 102 and 103 is closed.

A drive circuit 130 for a motor 131 for driving the oil pump 20 comprises a series circuit consisting of the motor 131, a field coil 132, a variable resistor 133, a fuse 134, an ignition switch 135, and a battery 136, a switching transistor 137 and another variable resistor 138 both of which are connected in parallel with the variable resistor 133. The output of the OR gate 116 is connected to the base of the switching transistor 137. When the first variable resistor 133 has a value $R_A$ whereas the second variable resistor is of value $R_B$, the motor drive circuit 130 has a resistance equal to $R_A$ when the switching transistor 137 is cut off but when it is conducting the drive circuit 130 has a smaller resistance equal to $R_A R_B / R_A + R_B$ and the motor driving current, the rotational speed of the motor and the discharge of the pump are all increased. Therefore the optimum resistances $R_A$ and $R_B$ must be selected depending upon the flow rate in the hydraulic control circuit or system when the switching transistor is cut off or conductive, respectively.

When the 1–2 gear shift occurs when D or 2 range is selected so that the signal applied to the first motor drive control circuit 110 changes from "1" to "0", the circuit 110 emits the output signal "1" for a time interval $t$ because of the delay circuit 111 and the output signal is inverted to "1" by the inverter 112. Therefore the output signal of the NOR gate 114 is "0" but the output signal from the AND gate 113 is a pulse signal with a pulse width of $t$ which is applied to the base of the switching transistor 137 through the OR gate 116. As a result the switching transistor 137 is conductive for a time $t$ so that the resistance of the motor drive circuit 130 is reduced. The rotational speed of the motor 131 is therefore increased so that the discharge of the oil pump 20 is also increased. In this case the signal "1" or "0" applied to the second motor control circuit 120 remains unchanged so that the input signals applied to the AND gate 123 and the NOR gate 124 are "1" and "0" respectively. As a result the output signal of the OR gate 125 is "0". This means that the output signal from the second motor control circuit 120 does not affect the operation of the motor drive circuit 130 at all. When the 2–1 downshift occurs when the D or 2 range is selected so that the signal applied to the first control circuit 110 changes from "0" to "1", the NOR gate 114 generates as an output a pulse signal with a pulse width $t$ so that the switching transistor 137 is rendered conductive, thus resulting in an increase in the rotational speed of the motor 131.

When the 2–3 upshift occurs when the D range is selected so that the signal applied to the second motor drive control circuit 120 changes from "1" to "0", the AND gate 123 generates an output pulse signal with a pulse width $t$. When the 3–2 downshift occurs, a pulse signal with a pulse width $t$ is derived. In both cases the transistor 137 is rendered conductive for a time interval $t$ so that the speed of the motor 131 is increased. In this case the output signal from the first motor drive control circuit 110 remains "0" so that the operation of the motor drive circuit 130 is not affected by the output signal of the first motor drive control circuit 110.

In addition to the upshift or downshift in the forward range, the solenoids 58 and 78 are de-energized in the N and P ranges, but in first gear in the D and 2 ranges they are energized so that when the range shifts from the N or P range to D or 2 range the signals applied to the first and second motor drive control circuits 110 and 120 are changed. As a result, the speed of motor 131 is increased. When the range is shifted to R or L, the switch 102 or 103 is closed so that the pulse signal with a pulse width $t$ is also applied to the base of the transistor 137 through the OR gate 118, the signal time interval setting circuit 117 and the OR gate 116 so that the speed of motor 131 is also increased.

According to the present invention the oil pump 20 is driven by the motor 131 whose rotational speed is changed because the resistance of the motor drive circuit 130 is changed when upshift or downshift occurs in the forward range, when the range is changed from N or P range to another range or when the range R or L is selected. The minimum discharge of the pump by the motor which rotates at a relatively low speed is selected for the ordinary travel of an automotive vehicle so that even when the upshift or downshift occurs or when the range is changed, the oil pump discharge is increased as the rotational speed of the motor is increased. As a result hydraulic response delay or decrease in hydraulic pressure may be prevented.

Figure 4C:
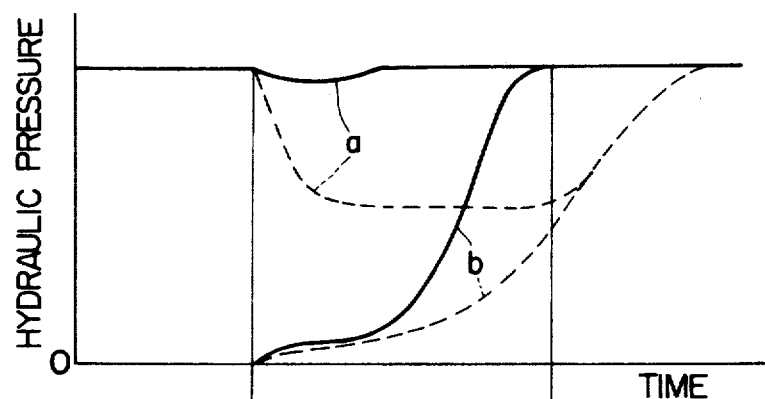
FIGS. 4a-c are graphs showing the relation between rotational speed of a motor which drives an oil pump and hydraulic pressure applied to hydraulic servos.
Figure 4B:
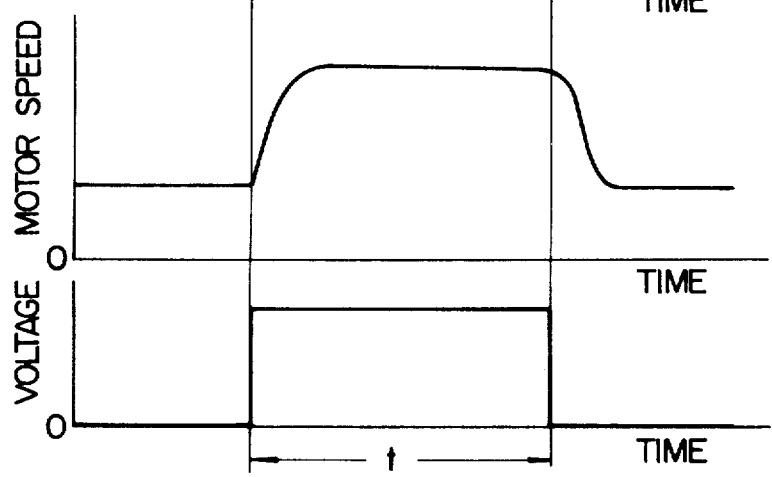
Figure 4A:
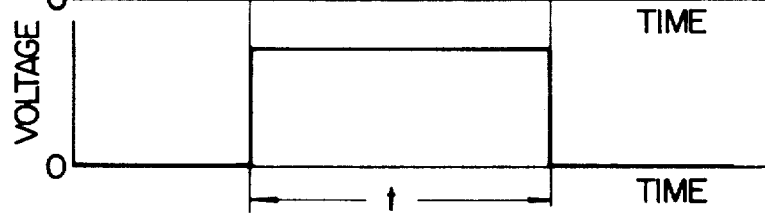

The relationship between the drive control of the motor 131 and the hydraulic characteristics of the hydraulic servos 4', 6', 7', and 8' in the hydraulic control system shown in FIG. 2 is illustrated in FIGS. 4a–c. FIG. 4a illustrates the output signal of the OR gate 116; FIG. 4b illustrates the rotational speed of the motor 131; and FIG. 4c illustrates the hydraulic pressure of the servo which has been already actuated and of the servo which is to be actuated in response to the upshift, downshift or range shift, the curve $a$ indicating the front clutch servo 4' while the curve $b$, the other servos 6', 7' or 8'. The broken line curves shown in FIG. 4c indicate the case where the pump discharge remains constant and they are shown for the purpose of comparison with the present invention. It is clearly seen that according to the present invention when upshift, downshift or the range shift occur the hydraulic pressure supplied to the hydraulic servo 4' remains almost unchanged whereas the hydraulic pressure in the hydraulic servos 6', 7' or 8' rises very rapidly so that the clutches and brakes may be positively applied very rapidly without causing any slippage.

It is to be understood that the present invention may be also applied to an automatic transmission with more than four speeds.

While specific embodiments of the invention have been shown and described in detail to illustrate the application of the inventive principles, it will be understood that the invention may be embodied otherwise without departing from such principles.

What is claimed is:

1. A control system for controlling hydraulic pressure in a hydraulic control circuit for an automotive vehicle automatic transmission, said hydraulic control circuit including means for automatically shifting gear ratios in said automatic transmission and means for manually selecting an operating range for said transmission, said transmission including clutch and brake means for determining gear ratios for said transmission, hydraulic servo means responsive to hydraulic pressure for operating said clutch and brake means, and conduit means for transmitting hydraulic fluid from said hydraulic control circuit to said servo means, said control system comprising a pump for supplying hydraulic fluid under pressure to said hydraulic control circuit, means for driving said pump, and a pump drive control circuit for controlling said pump drive means to vary the output of said pump in accordance with operation of said automatic transmission, said pump drive control circuit including means for maintaining said pump output at a lower level when no gear ratio shifting and no range shifting is occurring in said transmission, and means increasing the output of said pump to a higher level for a time period during operation of said servo means when gear ratio shifting or range shifting are occurring.

2. A system according to claim 1 wherein said means for driving said pump comprises an electric motor having an electrical circuit for controlling operation thereof, and wherein said drive control circuit includes a parallel circuit having a first resistor connected in one leg thereof and a second resistor and a transistor connected in another leg thereof, means connecting said parallel circuit in series with said electrical circuit controlling said motor, and logic circuit means responsive to operation of said automatic transmission for switching said transistor between a conductive and a non-conductive state to vary the resistance in said electrical circuit controlling said motor whereby the operating speed of said motor may be varied to increase or decrease the output of said pump in accordance with the operating state of said transmission.

3. A system according to claim 1 wherein said pump drive control circuit includes logic circuit means for applying a signal derived from automatic shifting means to said logic circuit means, means for applying a signal derived from said manual selecting means to said logic circuit means, said logic circuit means including means for coordinating said signals applied thereto and for applying a control signal representative of the operating condition of said automatic shifting means and of said manual selecting means as a control function to said pump drive means.

4. A system according to claim 3 wherein said automatic shifting means include a shift signal generator comprising means for sensing the velocity of said vehicle and for generating a signal representative thereof, means for sensing the load upon an engine powering said vehicle and for generating a signal representative thereof, and means for comparing said signals generated by said velocity and load sensing means and for applying a control signal representative of said compared signals as a control function to both said hydraulic control circuit and to said logic circuit means.

5. A system according to claim 4 wherein said transmission includes means defining a first, a second and a third gear ratio, wherein said automatic shifting means include first means for shifting said transmission between said first and said second gear ratios and second means for shifting said transmission between said second and said third gear ratios, and wherein said shift signal generator includes means for generating a pair of signals and for applying said pair of signals to said automatic shifting means, with one of said pair of signals being effective to control shifting of said transmission between said first and said second gear ratios and with the other of said pair of signals being effective to control shifting of said transmission between said second and said third gear ratios, said system further including first and second logic circuit elements formed as part of said logic circuit means, and means for applying one of said pair of signals to said first logic circuit element and the other of said pair of signals to said second logic circuit element.

6. A system according to claim 5 including switch means for generating a signal representative of the range setting of said manual selecting means, and wherein said logic circuit means include a third logic circuit element connected to receive signals from said switch means and gate means connected to receive signals from said first, said second and said third logic circuit elements to derive therefrom a resultant control signal and to apply said resultant signal as a control function to said pump driving means.

7. In an automotive vehicle powered by an internal combustion engine, a control system for controlling hydraulic pressure in a hydraulic control circuit for an automatic transmission of said vehicle,
  said hydraulic control circuit including
    electrically actuated means for controlling flow of hydraulic fluid in said hydraulic control circuit in response to electrical control signals applied thereto to effect automatic shifting of said transmission, said control system comprising:
  shift signal generating means for applying electrical control signals to said electrically actuated means to effect automatic shifting of said transmission in accordance with the operating conditions of said vehicle, said shift signal generating means including
    vehicle velocity detecting means for generating signals representative of the velocity of said vehicle,
    engine load detecting means for generating signals representative of the load of said internal combustion engine, and
    comparator means for comparing the signals emitted from said vehicle velocity detecting means and said engine load detecting means and for applying said signals to said electrically actuated means to control shifting of the gear ratios of said transmission in accordance with the operating conditions of said vehicle;
  range signal generating means including manual transmission range setting means for applying to said comparator means signals representative of a desired shift range setting for said transmission to control application of the control signals from said shift signal generating means to said electrically actuated means in accordance with said shift range setting;
  fluid pump means including electrical drive circuit means for supplying hydraulic fluid under pressure to said hydraulic control circuit;
  logic circuit means responsive to the control signals applied from said shift signal generating means to said electrically actuated means for applying fluid pressure control signals to said electrical drive circuit means to control the output of fluid supplied to said hydraulic control circuit by said fluid pump means;
  said logic circuit means including means for maintaining the output of said fluid pump means at a predetermined lower level when no transmission gear ratio shifting and no change in said shift range setting is occurring and to increase the output of said fluid pump means to a higher level during the occurrence of changes in said transmission gear ratio and in said shift range setting.

* * * * *